UNITED STATES PATENT OFFICE.

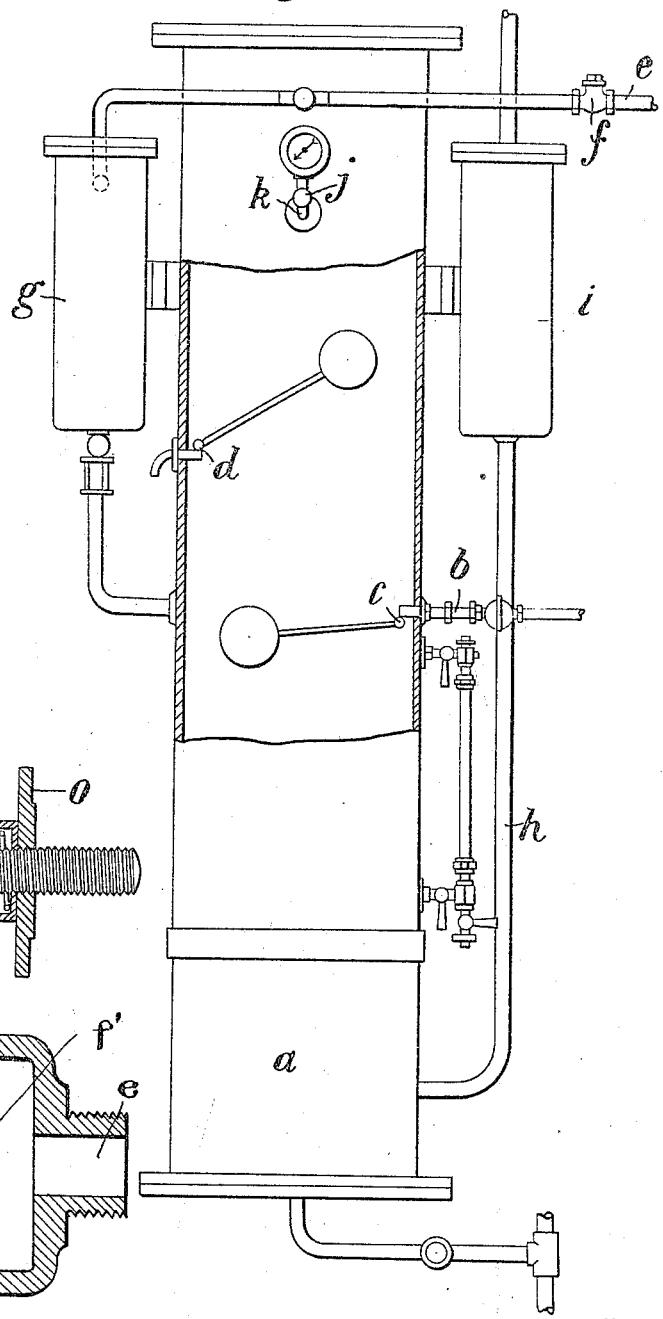
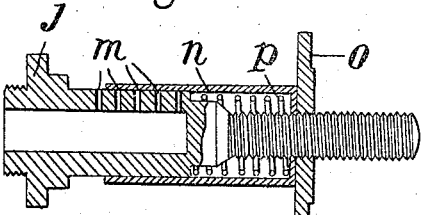
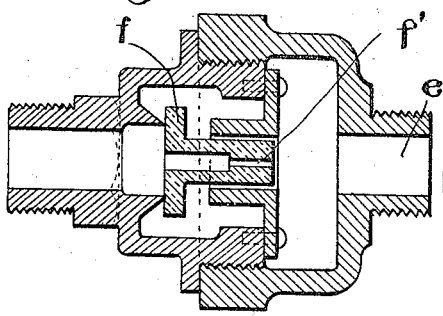

HERBERT SMETHURST, OF HOLLINWOOD, ENGLAND.

HUMIDIFYING OR SPRAYING APPARATUS.

1,294,551.  Specification of Letters Patent.  Patented Feb. 18, 1919.

Application filed September 17, 1917. Serial No. 191,833.

*To all whom it may concern:*

Be it known that I, HERBERT SMETHURST, a subject of the King of Great Britain, and resident of Progress Works, Hollinwood, England, have invented certain new and useful Improvements in Humidifying or Spraying Apparatus, of which the following is a specification.

This invention relates to humidifying or spraying apparatus of the type in which air and liquid under pressure are delivered through adjacent nozzles whereby the liquid is atomized, and has for its object to provide simple and convenient means for regulating the pressure upon the liquid supplied to said nozzles so that this may be adjusted to any predetermined amount and for insuring that the pressure upon said liquid shall be removed when the air supply is discontinued so that the discharge of unatomized liquid through the spraying nozzles is prevented.

My invention comprises the combination with a liquid containing vessel having means for placing the liquid therein under air pressure, of a non-return valve upon the air passage adapted to open away from said vessel but allowing of continuous but restricted communication between the source of compressed air and the liquid containing vessel, and adjustable means upon said liquid vessel adapted to permit of a regulated rate of escape of air from said vessel.

My invention further comprises the combination with said liquid containing vessel, of a water filter disposed in the delivery pipe of said vessel and at a level higher than the normal level of the liquid in the latter for the purpose described.

My invention further comprises the provision in combination with said liquid containing vessel and a float controlled water inlet valve thereon, of a float controlled overflow valve adapted to allow of the discharge of water from the vessel should the level of the latter exceed a certain height due to the inoperation of the water inlet controlling float.

Referring to the accompanying explanatory drawings:—Figure 1 is an elevation partly in section of a liquid containing vessel constructed and arranged with its connections in one convenient form in accordance with my invention and Fig. 2 is a detail view of one form of leaking-off valve. Fig. 3 is a detail view to be hereinafter referred to.

The liquid containing vessel $a$ receives its supply of liquid by the pipe $b$ past the float controlled valve $c$. A further float controlled valve $d$ serves as a safety overflow valve and is opened by its float if the float valve $c$ becomes inoperative from any cause and the liquid in the vessel tends to rise unduly in the vessel.

The supply of compressed air for putting the liquid under pressure is obtained by the pipe $e$ from any convenient source, and upon such pipe is fitted a non-return valve $f$ opening away from the vessel $a$ but having a small aperture through the valve which permits of a continuous but restricted flow of air into the vessel $a$ when the pressure in the pipe $e$ exceeds that in the vessel.

I may provide a vessel $g$ which may be charged with a disinfectant or other liquid under the pressure in the air pipe and which delivers said disinfectant through a sight feed device into the vessel $a$.

On the water delivery pipe $h$ from the vessel $a$ I provide a filter $i$ situated higher than the normal liquid level in the vessel $a$ so that any impurities deposited on the gauze or other filtering material in said filter as the water is delivered therethrough, will be returned to the bottom of the vessel $a$ when the delivery from the latter ceases and the liquid returns through the delivery pipe to said vessel owing to the removal of the air pressure from the surface of the liquid.

To regulate the pressure upon the surface of the water in the vessel $a$, I provide an air escape valve $j$ on the gage pipe $k$, the said valve permitting of the escape of air at an adjustable rate sufficiently less than the rate at which the air can travel through the small aperture in the valve $f$, to permit of any desired pressure up to that in the pipe $e$ being maintained in said vessel $a$.

Fig. 2 shows one convenient form of escape valve in which there are several small apertures $m$ capable of being closed by a sleeve $n$ moved in one direction by the screwed disk $o$ and in the other direction by the spring $p$. This form of valve allows of a ready regulation of the rate of escape of the air.

Should the pressure in the pipe $e$ fall, due to the stoppage of the air compressor supplying same, the air in the vessel $a$ will force open the valve $f$ and pass to the sprayers so insuring that the liquid in $a$ is no longer under pressure and that the last of the liquid in the sprayers is atomized.

I do not limit myself to the details of construction of the liquid container but may modify same to suit requirements.

Having now described my invention what I claim as new and desire to secure by Letters Patent is:—

1. In humidifying or spraying apparatus in combination a liquid containing vessel, an air supply conduit to and a liquid delivery pipe from said vessel, means allowing of the flow of air at a restricted rate to said vessel from said air conduit, means allowing of a rapid automatic discharge of air from the vessel to the air conduit when the pressure in the latter falls below the pressure in the vessel, and continuously open adjustable air escape means upon the vessel for controlling the pressure therein, as set forth.

2. In humidifying or spraying apparatus, in combination a liquid containing vessel, an air supply conduit to and a liquid delivery pipe from said vessel, a non-return valve upon the air conduit opening away from the vessel but allowing of continuous but restricted communication between conduit and vessel when the valve is closed, and continuously open adjustable air escape means upon the vessel for controlling the pressure therein, substantially as described.

3. In humidifying or spraying apparatus, in combination a liquid containing vessel, an air supply conduit to the upper part of said vessel, a non-return valve upon the air conduit opening away from the vessel but allowing of continuous but restricted communication between conduit and vessel when the valve is closed, a liquid supply conduit to said vessel, a float controlled valve upon said conduit, a water overflow pipe upon the liquid vessel and a float controlled valve upon said pipe, a water delivery pipe upon said vessel, a water filter disposed in said delivery pipe at a level higher than the normal level of the liquid in the vessel, and continuously open adjustable air escape means upon the vessel for controlling the pressure therein, as set forth.

In testimony whereof I have signed my name to this specification in the presence of two subscribing witnesses.

HERBERT SMETHURST.

Witnesses:
ARTHUR HUGHES,
ERNALD SIMPSON MOSELEY.

Copies of this patent may be obtained for five cents each, by addressing the "Commissioner of Patents, Washington, D. C."